(12) United States Patent
Schindler et al.

(10) Patent No.: US 8,538,648 B2
(45) Date of Patent: Sep. 17, 2013

(54) CAPTURING ACTUATOR POSITION

(75) Inventors: Michael Schindler, Buehl (DE);
Matthias Panzer, Karlsruhe (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 29 days.

(21) Appl. No.: 13/227,996

(22) Filed: Sep. 8, 2011

(65) Prior Publication Data
US 2012/0016560 A1   Jan. 19, 2012

Related U.S. Application Data

(63) Continuation of application No. PCT/DE2010/000235, filed on Mar. 1, 2010.

(30) Foreign Application Priority Data

Mar. 12, 2009 (DE) .......................... 10 2009 012 882

(51) Int. Cl.
*G06F 7/00* (2006.01)
*G06F 17/00* (2006.01)
*G06F 19/00* (2011.01)

(52) U.S. Cl.
USPC ................................ 701/67; 701/51; 701/68

(58) Field of Classification Search
USPC .............................................. 701/51, 67, 68
See application file for complete search history.

(56) References Cited

U.S. PATENT DOCUMENTS

| | | | | |
|---|---|---|---|---|
| 5,678,673 A * | 10/1997 | Borschert et al. | ............ | 192/84.6 |
| 6,679,362 B2 * | 1/2004 | Berger et al. | .................... | 192/31 |
| 6,785,599 B2 * | 8/2004 | Berger et al. | .................... | 701/51 |
| 6,834,221 B2 * | 12/2004 | Jager et al. | .................... | 701/30.3 |
| 6,865,467 B2 * | 3/2005 | Berger et al. | .................... | 701/51 |
| 7,008,349 B2 * | 3/2006 | Zimmermann et al. | ....... | 477/107 |
| 7,424,356 B2 * | 9/2008 | Jung et al. | ........................ | 701/67 |
| 7,574,296 B2 * | 8/2009 | Baehr et al. | .................... | 701/67 |
| 7,854,162 B2 * | 12/2010 | Panzer et al. | .............. | 73/115.04 |
| 8,052,162 B2 * | 11/2011 | Yang et al. | .................... | 280/166 |
| 8,052,579 B2 * | 11/2011 | Eich et al. | ..................... | 477/175 |

FOREIGN PATENT DOCUMENTS

| | | |
|---|---|---|
| DE | 199 53 292 A1 | 5/2001 |
| DE | 10 2005 017 024 A1 | 12/2005 |
| DE | 10 2005 030 185 A1 | 2/2006 |
| DE | 10 2006 043 075 A1 | 4/2007 |
| WO | 2006136140 A1 | 12/2006 |

* cited by examiner

Primary Examiner — Khoi Tran
Assistant Examiner — Rachid Bendidi
(74) Attorney, Agent, or Firm — Lucas & Mercanti, LLP

(57) ABSTRACT

A method for operating a drive device for adjusting an automated clutch in a motor vehicle. The motor vehicle has a control device by which at least one control of the drive device and one capture of measurement data of a clutch travel sensor takes place for determining the setting of the automated clutch. The drive device has a drive motor with a drive connection to a displaceable element to be positioned. A travel range of the displaceable element is monitored and a referencing procedure is performed cyclically after a prescribed time and is followed by a plausibility check if referencing is permitted at the point in time.

8 Claims, 1 Drawing Sheet

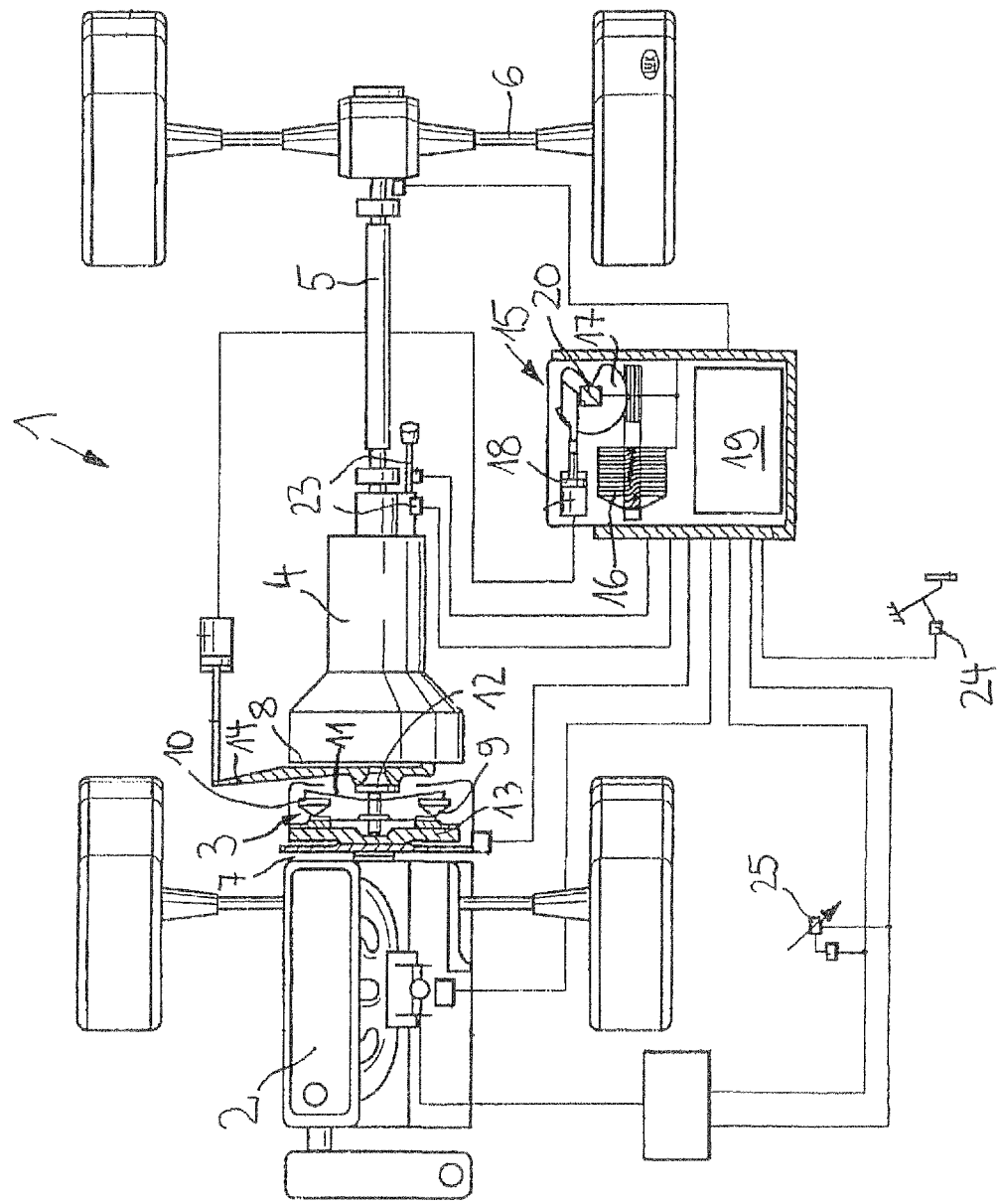

CAPTURING ACTUATOR POSITION

This application is a 371 of PCT/DE2010/000235 filed Mar. 1, 2010, which in turn claims the priority of DE 10 2009 012 882.4 file Mar. 12, 2009. The priority of both applications is hereby claimed and both applications are incorporated by reference herein.

FIELD OF THE INVENTION

The invention relates to a method for operating a drive device and adjusting an automated clutch in a motor vehicle, to a computer program product, and to an apparatus for operating a drive device for adjusting an automated clutch in a motor vehicle.

BACKGROUND OF THE INVENTION

Automatic clutches and automatic transmissions have become more and more widespread. They are activated by means of an actuator system.

The absolute position of such systems is frequently determined here by incremental capturing of the positions of an actuator system by means of an incremental position sensor system.

In patent application DE 10 2005 017 024 A1, which originates from the applicant, a method for performing open-control and/or closed-control of a clutch of an automatic transmission in the drive train of a vehicle is proposed. According to this method, an evaluation criterion is used to qualify a clutch characteristic curve which is used at a particular time, in order to select an adaptation strategy or control strategy as a function of this evaluation criterion. This evaluation criterion constitutes a measure of trust—a trust measure—for the adapted clutch characteristic curve. For example, the trust measure is decreased as a function of the time which has passed since the last adaptation step. It is also proposed that the trust measure he reduced as the adaptation error increases.

DE 10 2006 043 075 A1 discloses a method which provides that a signal is made available which is a measure of the confidence in the absolute position signal or of the reliability of the absolute position signal, and that this signal is set, during or after the detection of a false state, to a value to which a relatively low reliability or a relatively low value for confidence is assigned.

Changes, in particular changes in length in the clutch system, cannot be detected or can be detected only with very great difficulty. This can lead to a situation in which incorrect positions can be unintentionally traveled to by the actuator system, said positions not corresponding to the actual target positions.

This can lead to situations which are critical for safety or which damage the system. The situation which is critical for safety can occur, for example, if a clutch actuator system unintentionally travels to an excessively high position and therefore more clutch torque is transmitted than desired. Within the scope of this document, high positions are to be understood as meaning positions in the region of the closed clutch and low positions are to be understood as meaning positions in the region of the opened clutch.

According to the prior art, when the clutch system is activated or powered up and when it is switched off, referencing is usually carried out, and the absolute position is therefore reconciled with the capturing of the incremental travel. During operation such reconciliation is carried out according to the prior art only if something conspicuous is discovered in the system, such as for example blocking of the actuator or a fault in the capturing of the incremental travel.

The object of the present invention is therefore to ensure that shifts in the actuator system do not lead to incorrect results of the capturing of the absolute travel.

In clutch systems with capturing of incremental travel, the absolute position of the actuator system must take place by summing the increments with the correct sign when changes in position occur.

At a predefined time, a reference position must be traveled to in order to reconcile the incremental capturing of the position with an absolute position which is calculated therefrom.

If shifts occur in the hardware during operation of the actuator system, caused by changes in the hardware or by electrical problems relating, for example, to electromagnetic compatibility (EMC) or reset, this must be detected and a reaction must occur in the form of a renewed reconciliation between the capturing of the absolute travel and the capturing of the incremental travel.

The reconciliation is carried out by what is referred to as referencing. In this context, the mechanical stop of the system is traveled to at a minimum position and the absolute position is set to the defined position value of this stop.

The sequences are controlled by an internal variable, the confidence in the position. If deviations are detected, the method is reduced, and when reconciliation has taken place the confidence is increased again.

The system is fully operationally ready only with a high confidence level. The functionality is restricted when the confidence level is reduced.

SUMMARY OF THE INVENTION

In order to achieve the object, the invention proposes introducing detection mechanisms in order to be able to detect shifts between the capturing of the absolute travel and the capturing of the incremental travel, as well as, if appropriate, to trigger appropriate reactions.

This means improving the reconciliation logic.

For this purpose, the confidence position is implemented in multiple stages in order to be able to map different degrees of shifts in the actuator system.

According to the invention, a method is proposed for operating any drive device for adjusting an automated clutch in a motor vehicle. The motor vehicle has a control device by means of which at least one control operation of the drive device and one capturing operation of measured data of a clutch travel sensor for determining the position of the automated clutch take place. The drive device has a drive motor which has a drive connection to a moveable element which is to be positioned.

According to the invention, the method provides that a movement range of the moveable element is monitored, and a referencing process with subsequent plausibility checking is carried out cyclically after a predefined time if referencing is permitted at this time. Furthermore there is provision that position data are stored in a nonvolatile memory.

Whether referencing is permitted at this time is determined by another method.

Advantageous embodiments of the invention can be found in the dependent claims.

The method according to the invention provides that if when the movement range of the moveable element is being monitored, it is detected that a predefined minimum movement is undershot or a predefined maximum movement is exceeded, a confidence value relating to the clutch is reduced.

When a predefined limiting value is undershot by the confidence value, a referencing process is initiated.

If referencing is not permitted, referencing is not carried out until referencing is permitted again. If referencing is not permitted by a method other than the method according to the invention, the information to the effect that referencing was initiated but was not carried out is stored so that referencing is executed as soon as it is permitted again by the other method.

After the clutch open stop has been reached at the end of the referencing process, the plausibility checking provides for the clutch closed stop to be subsequently traveled to, wherein the movement process which is determined here is checked for plausibility.

According to the invention, a computer program product is also proposed which has a computer program which has software means for carrying out the above-mentioned methods when the computer program is run on a computer. Such a computer can be part of a control unit for controlling an automated clutch.

The invention also proposes an apparatus for operating a drive device for adjusting an automated clutch in a motor vehicle for carrying out one of the above-mentioned methods. The motor vehicle has a control device by means of which at least one control operation of the drive device and one capturing operation of measured data of a clutch travel sensor for determining the position of the automated clutch take place. The drive device has a drive motor which has a drive connection to a moveable element which is to be positioned. According to the invention, the control device is provided for the purpose that a movement range of the moveable element can be monitored, and a referencing process with subsequent plausibility checking is carried out cyclically after a predefined time if referencing is permitted at this time, and position data can be stored in a nonvolatile memory.

BRIEF DESCRIPTION OF THE DRAWING

An exemplary embodiment of the invention will be explained in more detail below with reference to the drawing, in which:

The FIGURE is a schematic illustration of a motor vehicle.

DETAILED DESCRIPTION OF THE INVENTION

A motor vehicle, denoted in its entirety by 1 in the FIGURE, has a drive train with a drive unit 2 such as, for example, a motor or an internal combustion engine. Furthermore, a clutch 3 and a transmission 4 are arranged in the drive train. The clutch 3 is arranged in the force flux between the drive unit 2 and the transmission 4, wherein a drive torque of the drive unit 2 is transmitted via the clutch 3 to the transmission 4 and from the transmission 4 on the output side to an output shaft 5 and to an axle 6 arranged downstream and to the wheels.

The clutch 3 has a drive side 7 and an output side 8, wherein a torque is transmitted from the drive side 7 to the output side 8 by virtue of the fact that, for example, forces are applied to a clutch disk 9 by means of a pressure plate 10, a disk spring 11 and a disengagement bearing 12 as well as a flywheel 13. For this application of force, the disengagement lever 14 is actuated by means of an actuator 15.

The actuator 15 has a drive motor 16, preferably an electronically commutated electric motor which is connected via a speed-changing transmission 17 to a moveable element 18, specifically a master cylinder of a hydraulic clutch activation device. The latter has a drive connection to the disengagement lever 14. The drive motor 16 is actuated by means of a control device 19 which has an electronic control system which is connected via an output stage to a winding of the drive motor 16.

The movement of the moveable element 18 is captured incrementally by means of a clutch travel sensor 20. For this purpose, for example a plurality of Hall sensors are arranged offset with respect to one another in the circumferential direction on the stator of the drive motor 16, said Hall sensors interacting with permanent magnetic poles which are provided on the rotor of the drive motor 16. Whenever the Hall sensor passes by a magnetic pole, an electrical pulse is generated.

The application of force of the pressure plate 10 or of the friction lining means can be selectively set in accordance with a supplied setpoint value signal by means of a position of the moveable element 18. In this context, the pressure plate 10 can be positioned as desired between two end positions and secured in the corresponding position. One end position corresponds to a fully engaged clutch position, and the other position to a fully disengaged clutch position.

In order to set a torque which can be transmitted with the clutch 3, a position of the pressure plate 10 which lies in an intermediate region between the two end positions can be adopted. The moveable element 18 is for this purpose positioned in a corresponding position using the actuator 15.

So that the clutch 3 can be moved into the position necessary for the torque which is to be transmitted, an absolute position signal which indicates the position of the moveable element is generated. For this purpose, the moveable element 18 is moved into a predetermined reference position in a first step using the drive motor 16. This can be achieved, for example, by virtue of the fact that the moveable element 18 is positioned against a fixed mechanical stop in the known position, and the reaching of the stop is detected.

In order to detect the stop, the measurement signal of the clutch travel sensor 20 can be evaluated. If the measurement signal remains constant during the actuation of the drive motor 16 in the direction of the stop, the stop is detected. Of course, it is, however, also possible to detect the positioning of the moveable element 18 against the stop independently of the measurement signal of the clutch travel sensor 20 using a separate reference position sensor such as, for example, a limit switch.

As soon as the reaching of the reference position has been detected, a supplied absolute position signal is set to a reference value which is assigned to the reference position, for example to the value 0.

The position of the moveable element 18 is then changed using the drive motor, for example in order to correspondingly adjust the position of the pressure plate 10 when a change occurs in the setpoint value signal for the application of force to the pressure plate 10. The incremental position measuring signal is monitored, and the absolute position signal is correspondingly adjusted when a change in the incremental position measuring signal occurs.

The method according to the invention provides, inter alia, for the movement range of the actuator system to be monitored.

The position of the clutch is monitored on the basis of the absolute position values, and when a predefined minimum or maximum position limiting value is infringed the confidence is reduced. Different degrees of reduction in confidence are implemented depending on the upper limit or lower limit and on the amount of upward or lower transgression.

When the predefined maximum permitted position limiting value is exceeded, the confidence is completely reduced, since it can be assumed that there is a shift in the critical direction of "closing the clutch."

When the predefined minimum position limiting value is undershot by only a small position offset in the case of the "clutch open" stop, the confidence is only partially reduced since it can be assumed that the mechanical slip clutch has responded when the clutch is automatically adjusted.

In the case of significant undershooting of the minimum permitted position by a large position offset, the confidence is completely reduced since such large shifts cannot be caused by the friction clutch.

The method according to the invention also provides for further referencing processes to be initiated.

A logic is introduced of carrying out referencing cyclically after a predefined time. This referencing also takes place without the previous loss of confidence. If significant shifts are detected here, the confidence is reduced. Such referencing can, however, be prevented by another method if the clutch activity does not permit it. The referencing is not carried out again until the other method permits referencing again. The information to the effect that referencing was requested is stored so that referencing can be carried out as soon as referencing is permitted again.

Cyclical referencing increases the probability of detecting shifts between a calculated absolute position and a measured incremental position.

The differences in position which are determined during referencing and which are the amount by which the capturing of the position is reconciled are additionally stored with the correct signs. The accumulated differences permit a statement to be made about shifts. If said shifts exceed a predefined limiting value, a position reconciliation is either initiated anew on the basis of a reduction in confidence, or even more wide ranging measures, for example the deactivation of the system, are initiated.

The method according to the invention also provides for the reconciliation of position to be improved.

In order to increase the quality of the reconciliation of position, the referencing is supplemented by plausibility checking. The referencing approaches the stop at the "clutch open" position. After this, the available movement path in the direction of "clutch closed" is then tested by plausibility checking.

The plausibility checking can approach the upper stop at the "clutch closed" position or only approach a predefined maximum position if the approaching of the upper stop is not permitted or not possible because frequent approaching can cause damage to the upper stop.

This increases the safety with which the incremental capturing of a position operates.

The method according to the invention also provides for the information which is relevant for the capturing of a position to be stored in a nonvolatile memory.

The relevant information such as, for example the absolute position and the value of the confidence are stored in a nonvolatile memory such as, for example, EEPROM and/or buffered RAM. As a result, the capturing of a position can be initialized when the control device is powered up.

The time for the powering up is therefore reduced, and the safety with which the capturing of the incremental travel operates is increased.

LIST OF REFERENCE NUMBERS

1 Motor Vehicle
2 Drive Unit
3 Clutch
4 Transmission
5 Output Shaft
6 Axle
7 Drive Side
8 Output Side
9 Clutch Disk
10 Pressure Plate
11 Disk Spring
12 Disengagement Bearing
13 Flywheel
14 Disengagement Lever
15 Actuator
16 Drive Motor
17 Speed-changing transmission
18 Moveable Element
19 Control Device
20 Clutch Travel Sensor
23 Sensor for Determining the Shift Lever Position
24 Sensor for Determining the Position of a Brake Pedal
25 Idling Switch

The invention claimed is:

1. A method for operating a drive device, which has a control device and a drive motor with a drive connection to a moveable element, for adjusting an automated clutch in a motor vehicle, the method comprising the following steps:
   determining a position of the automated clutch by capturing data of a clutch travel sensor;
   monitoring a movement range of the moveable element;
   carrying out a referencing process with subsequent plausibility checking cyclically after a predefined time when referencing is permitted at the predefined time; and
   carrying out at least one control operation of the drive device using the control device.

2. The method according to claim 1, further comprising the step of storing the position of the automated clutch in a nonvolatile memory.

3. The method as claimed in claim 1, including the monitoring of the movement range of the moveable element includes detecting when a predefined minimum limit of the moveable element is undershot or a predefined maximum lima of the moveable element is exceeded, and reducing a confidence value relating to the clutch.

4. The method as claimed in claim 3, including initiating the referencing process, when a predefined limiting value is undershot by the confidence value.

5. The method as claimed in claim 3, wherein, when the referencing is not permitted, storing information indicating that the referencing was requested so that the referencing can be carried out as soon as the referencing is permitted again.

6. The method as claimed in claim 1, wherein, after an open stop of the clutch has been reached at the end of the referencing process, the plausibility checking includes subsequently traveling to a closed stop of the clutch, and checking a movement process.

7. A computer with a non-transitory computer readable media storing a computer program product, which has software means for carrying out a method for operating a drive device, which has a control device and a drive motor with a drive connection to a moveable element, for adjusting an automated clutch in a motor vehicle, the method comprising the following steps: determining a position of the automated dutch by capturing data of a dutch travel sensor, monitoring a movement range of the moveable element, carrying out a referencing process with subsequent plausibility checking cyclically after a predefined time when referencing is permitted at the predefined time and carrying out at least one control operation of the drive device using the control device when the computer program product is run on the computer.

8. An apparatus for operating a drive device for adjusting an automated clutch in a motor vehicle, comprising:
- a clutch travel sensor;
- a moveable element;
- a control device, which monitors a movement range of the moveable element and which allows for at least one control operation of the drive device and one capturing operation of measured data of the clutch travel sensor for determining a position of the automated clutch to take place;
- a drive motor, which has a drive connection to the moveable element which is to be positioned; and
- means for carrying out a referencing process with subsequent plausibility checking cyclically after a predefined time when referencing is permitted at the predefined time.

* * * * *